United States Patent [19]
Jefferson

[11] Patent Number: 5,299,018
[45] Date of Patent: Mar. 29, 1994

[54] SYSTEM AND METHOD FOR STORING RECEIVED FACSIMILE IMAGE DATA IN COMPUTER MEMORY

[75] Inventor: Darrell E. Jefferson, San Jose, Calif.

[73] Assignee: Xerox Corporation, Stamford, Conn.

[21] Appl. No.: 856,000

[22] Filed: Mar. 20, 1992

[51] Int. Cl.$^5$ .............................................. H04N 7/12
[52] U.S. Cl. .................................. 358/261.1; 358/426
[58] Field of Search ............................... 358/426–427, 358/261.1–261.4, 262.1

[56] References Cited

U.S. PATENT DOCUMENTS

| | | | |
|---|---|---|---|
| 4,811,113 | 3/1989 | Ozeki et al. ...................... | 358/261.1 |
| 5,008,951 | 4/1991 | Koshi ................................ | 358/261.1 |
| 5,107,345 | 4/1992 | Lee .................................... | 358/261.1 |

*Primary Examiner*—Stephen Brinich
*Attorney, Agent, or Firm*—John M. Kelly

[57] ABSTRACT

A system and method of converting facsimile image data as received by any one of a plurality of fax cards into data stored in a file structure that assists use of the facsimile image by application software and which permits efficient processing of the image by a host computer. The data structure is composed of a file header containing information relating to the dimensions of the facsimile image as converted and stored, and pages of facsimile image data which include page headers that specify the number of pixels in each scan line. The pages further include byte-boundary-limited binary encoded run lengths and end-of-line characters at the ends of each scan line that are used to store the facsimile images. The data in representing the last run length of each scan line is not stored, but is determinable using other information in the pages. Multiple facsimile images can be stored in a single data file by storing separate images in different pages.

7 Claims, 3 Drawing Sheets

File Header

| Offset | Size | Description | Ref |
|---|---|---|---|
| 0 | 2 bytes | File Signature (set to 0Hh, 00h) | 202 |
| 2 | 1 byte | Version number (currently set to 1) | 204 |
| 3 | 1 byte | Reserved (set to 80h) | 206 |
| 4 | 2 bytes | Number of pages in this file | 208 |
| 6 | 20 bytes | ID number of sending fax machine (blank filled) | 210 |
| 26 | 2 bytes | Reserved (set to 00h, 00h) | 212 |
| 28 | 4 bytes | Absolute file offset to first page | 214 |
| 32 | 4 bytes | Absolute file offset to first page | 216 |
| 36 | 4 bytes | Total number of bytes in this file | 218 |

Page Header

| Offset | Size | Description | Ref |
|---|---|---|---|
| Pg + 0 | 2 bytes | Number of pixels per scan line | 220 |
| Pg + 2 | 2 bytes | Number of Scan lines in the page | 222 |
| Pg + 4 | 2 bytes | Horizontal resolution (pixels per meter) | 224 |
| Pg + 6 | 2 bytes | Vertical resolution (Scan lines per meter) | 226 |
| Pg + 8 | 4 bytes | Number of bytes in page (this header included) | 228 |
| Pg + 12 | 4 bytes | Absolute file offset to next page | 230 |
| Pg + 16 | 1 byte | Page orientation<br>0xxx xxxx = Unknown<br>1xxx xx00 = 0°<br>1xxx xx01 = 90°<br>1xxx xx10 = 180°<br>1xxx xx11 = 270° | 232 |
| Pg + 17 | 15 bytes | Reserved (set to all 00's) | 234 |
| Pg + 32 | | < Image Data > | |

*FIG. 2*

|  | #BYTES | BYTE DATA | MEANING |
|---|---|---|---|
| 0 | 1 byte | 00000101 | White Run of Five |
| 1 | 1 byte | 00010000 | Black Run of Sixteen |
| 2 | 2 bytes | 10000100 | White Run of 521 |
| 3 |  | 00001001 | Spanning 2 Bytes |
| 4 | 1 byte | 10000000 | EOL Character (Designating a Black Run of 1186) |
| 5 | 1 byte | 01111111 | White Run of 127 |
| 6 | 2 bytes | 10000001 | Black Run of 129 |
| 7 |  | 00000001 | Spanning 2 Bytes |
| 8 | 1 byte | 10000000 | EOL Character (Designating a White Run of 1472) |
| 9 | 1 byte | 10000000 | EOL Character (Designating a White Run of 1728) |
| 10 | 2 bytes | 10010010 | White Run of 1296 |
| 11 |  | 00010000 | Spanning 2 Bytes |
| 12 | 1 byte | 10000000 | EOL Character (Designating a Black Run of 432) |
| · | · | · | · |
| · | · | · | · |
| · | · | · | · |

*FIG. 3*

SYSTEM AND METHOD FOR STORING RECEIVED FACSIMILE IMAGE DATA IN COMPUTER MEMORY

The present invention relates to techniques for storing facsimile image data.

BACKGROUND OF THE INVENTION

In recent years personal computers and facsimile machines have become nearly indispensable tools for many businesses. In response, numerous manufactures have developed facsimile machines, generically referred to hereinafter as fax cards, that operatively interconnect with personal computers. Such fax cards can usually transmit images stored in the computer's memory and can receive images from remote facsimile machines which are then stored in data files in the computer's memory.

While interconnected computers and fax cards are highly useful, their potential remains unfulfilled. This is at least partially related to the fact that different fax card manufacturers process received facsimile images differently, and thus the resulting data files have different formats. Some manufacturers store facsimile images in a run length encoded format according to the widely used CCITT G3 specification, others partially decode the G3 encoded format and then store the received image, while others completely decode the facsimile image and store it in a bit-map form. These differences make it impractical to write application software capable of working with all data file formats.

The incompatibility problem only grows if the computer/fax card system is networked. Then, a facsimile image stored in a data file format produced by one fax card may need to be re-transmitted by a fax card which only works correctly with data in a different file format. The number of possible fax card combinations on large systems becomes immense. While it might be possible to limit the number of brands of fax cards a given system might handle, to remain up to date, one would need to rewrite each application software package every time a supported fax card manufacturer modified its data file format. In the rapidly changing world of facsimile communications, complex application packages might become too expensive to develop and support. Besides, an unsupported fax card might become highly popular and its integration into existing systems might be beneficial.

The data file formats from different fax cards may not only be incompatible with each other, but they may also be incompatible with efficient data processing by the host computer. For example, a bit-mapped representation of a single facsimile image might contain more than 0.5M Bytes of data. Not only would such a large data file require significant memory, but if the bit-mapped image requires data processing (such as reformatting for retransmission using another fax card) excessive time might be required. While storing received facsimile images in a run length encoded format would usually require much less memory, data processing of such an image might even be slower. This is because some run length encoded formats store information about more than one run length within a single data byte. In that case, the individual run lengths would have to be separated before the image data could be processed. Such separation might require significant time.

Since speed is important in a computer system, and since data processing requires time, it would be advantageous to have a system of storing a facsimile image received by any one of a plurality of fax cards in a form which assists rapid processing of the image and use of the image by standardized software programs.

SUMMARY OF THE PRESENT INVENTION

The present invention is directed to techniques for creating and using a data file structure for facsimile images such that a facsimile image received by any one of a plurality of fax cards can be utilized by standardized software programs and which assists processing of the facsimile images. The data structure is composed of a file header containing information relating to the included file; and pages of facsimile image data, including page headers that specify page dimensions and the number of pixels in each scan line. The pages store images using byte boundary limited binary encoded run length data blocks and end-of-line characters at the end of each scan line. The last run length of each scan line is not stored, but is determinable using other information in the page. Multiple facsimile images can be stored in a single data file by storing separate images in different pages.

BRIEF DESCRIPTION OF THE DRAWINGS

Other aspects of the present invention will become apparent as the following description proceeds and upon reference to the accompanying drawings, in which:

FIG. 2 is a representational illustration of a data file structure according to the principles of the present invention; and FIG. 3 is a representational illustration of facsimile image data as stored within the data file structure of FIG. 2:

DETAILED DESCRIPTION OF THE ILLUSTRATED EMBODIMENT

Figure 1:
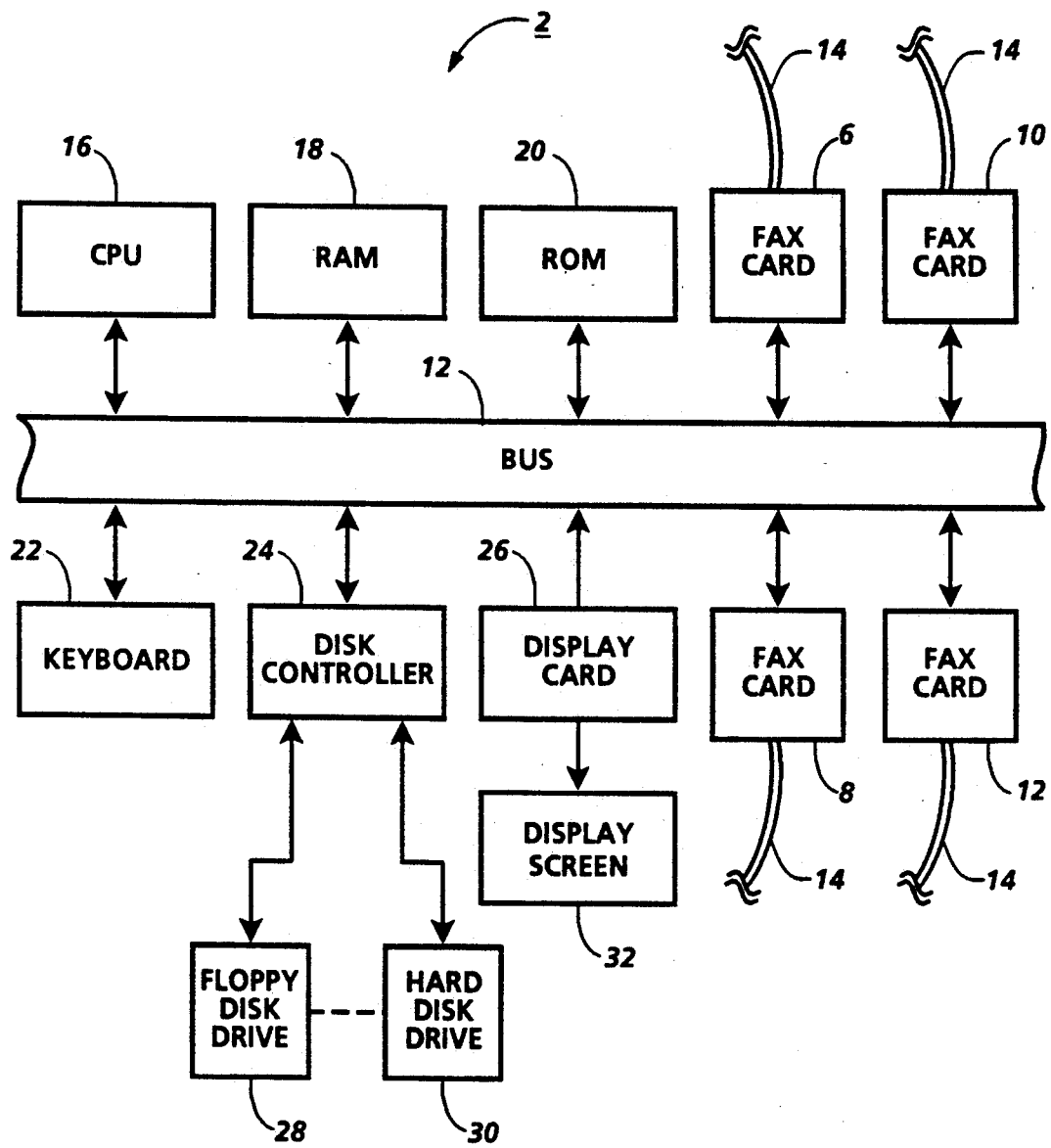
FIG. 1 shows a simplified schematic diagram of a computer and multiple fax card system suitable for practicing the present invention.

The present invention relates to the converting and storing of facsimile images received by any one of a plurality of fax cards into a specified data structure. The specified data structure assists application programs to make use of facsimile images received by different fax cards; assists in retransmitting facsimile images on a different brand of fax card than the card which received the images; and which assists efficient data processing by the computer.

FIG. 1 illustrates a suitable system 2 for practicing and explaining the present invention. The system 2 includes an IBM 386-type personal computer having a hard disk memory and a plurality of fax cards. As shown, the fax cards, cards A, B, C, and D (elements 4,6,8, and 10 respectively), connect to a common bus 12 and to a telephone line 14 (which may or may not be common). The bus 12 also interconnects a central processing unit 16 which controls overall system operation, a RAM 18 (random access memory) which stores operating programs and data, a ROM 20 (read only memory) which stores a boot-up program, a keyboard 22 for enabling an operator to input data, and a disk controller 24 and a display card 26. The disk controller controls the reading and writing of data on a floppy disk drive 28 and/or a hard disk drive 30, while the display card 26 processes information for display on a display screen 32.

After the system 2 is "booted-up", one or more fax card operating programs and a special data conversion program according to the principles of the present invention are loaded into memory. With the software programs loaded, any of the fax cards can receive a facsimile transmission. Assume for explanatory purposes that fax card A, operating per its manufacturer supplied operating program, receives a Group 3 type run length encoded facsimile transmission via the telephone line 14. The received facsimile image is encoded into the data format specified by the fax card manufacturer and is stored in a data file on one or more of the memory devices (the RAM 18, the floppy disk drive 28, and/or the hard disk drive 30). While the particular memory device(s) storing the data file is irrelevant to the principals of the present invention, it will be assumed that the data file is stored on the hard disk drive.

Because the resulting data file format is controlled by the fax card manufacturer, and because different manufacturers use different formats, one can do little with the stored facsimile image without using programs specially written for the specific data format. However, it is possible to develop conversion modules that convert the facsimile image data from each supported fax card into a constant format that a software package could then use. Beneficially, the conversion modules are bidirectional in that they could convert facsimile image data in the constant format back into any of the fax card data formats. The present invention takes such an approach.

The constant file format, referred to more descriptively hereinafter as the intermediate file format, is designed such that facsimile image data can be readily converted between it and many existing fax card formats. Since existing file formats are frequently modifications of the Group 3 (G3) data encoding format (known as modified Huffman, 1 D encoding), the intermediate file format is beneficially related to the Group 3 format. Specifically, the intermediate file format is comprised of a sequence of run length encoded data blocks organized by horizontal lines that terminate with a special end-of-line (EOL) data sequence. The data represents the lengths (in number of picture elements, hereinafter called pixels) of, alternately, white runs and black runs as they occur in the original image.

In addition to being related to the G3 format, the intermediate file format should assist rapid data processing of stored facsimile images by the computer. Since the basic unit of data in a computer is the byte (a block of eight bits), each run length should be associated uniquely with one or more bytes. Specifically, the intermediate file format is designed such that each run length is individually stored in either one or two bytes. While storing run lengths in this manner requires more memory then storing it with multiple run lengths sharing a single byte, the present technique assists rapid processing of data by the computer. This is because the byte boundaries clearly define where run lengths begin and end, and thus processing of image data to isolate individual run lengths is not required.

While it is useful to increase processing speed by using more memory, memory savings is still a worthwhile goal. Memory is saved in the intermediate file format by making use of the scan line length of the facsimile image. Since each facsimile image scan line represents a specific number of pixels, usually 1728, the sum of all of the run lengths for each scan line equals that specific number. Use of this fact, together with the special EOL character at the end of each scan line, can save memory. The last run length encoded data block for each scan line is not stored since it can be determined from:

Last Run Length=Pixels per scan line−Sum of Other Run Lengths

This technique permits a memory savings which may be significant. Note that the above summation can be performed using integer arithmetic.

Another beneficial feature of the intermediate file format is that it can store and manipulate multiple images in one file. This allows an operating program, such as DOS (disk operating systems used with IBM and compatible personal computers), to perform file manipulations, such as copying or deleting of multiple images, using a single command. Additionally, the storing of multiple images in a single file makes it easier to share facsimile images across a network.

The characteristics of the intermediate file format described above are achieved using the file structure and data structure illustrated in FIGS. 2 and 3, respectively. Referring now to the file structure 200 of FIG. 2, the intermediate file format has two parts, a file header comprising the first 40 bytes of memory, and the pages of image data. The file header begins with two bytes, 0Dh and 00h, that identify the file as one that is in the intermediate file format, line 202. The next two bytes provide the version number of the intermediate file format (currently set to one), line 204, and a byte reserved for future use, set to 80h, line 206. The next two bytes, line 208, form one word that designates the total number of pages in the intermediate data file. The next 20 bytes store the ID number, usually the telephone number, of the facsimile machine which sent the image or which is somehow related to that image, line 210. This information may not always be present since the intermediate file format is usable with facsimile images that are not received through fax. However, if an ID number is available it is useful for tracking the sources of images.

The next 2 bytes are reserved and are set to 00h and 00h, line 212. The next 4 bytes, line 214, form one long word that designates the byte offset to the first page of data, thereby indicating to the operating system where the pages begin. While the current implementation of the intermediate file format utilizes a 40 byte file header, it is prudent to have the ability to specify file headers of different sizes. Then as needs change, by varying the information of line 214, file headers of different lengths can readily be incorporated.

The next 4 bytes form one long word that provides the file offset to the last page of image data, line 216. This, together with the offset to the first page per line 214 and with the information in the page headers regarding offsets to the following page (pages headers are described below) permit rapid access (jumps) to desired pages of image data. The last four bytes of the file header form one long word that provides the total number of bytes in the file, line 218. This information is useful when knowledge of the size of the data file is required.

As indicated, pages of image data follow the file header. Each page will usually contain data of a different image, and thus each page begins with its own page header. The first 2 bytes of each page form one word that indicates the number of pixels on each scan line, line 220. The next two bytes form one word that provides the total number of scan lines in the page, line 222. The next 2 bytes form one word that provides the number of horizontal pixels per meter, line 224, followed by 2 bytes (one word) that provide the number of vertical scan lines per meter, line 226. The next 4 bytes form one long word that provides the total number of bytes in the present page (including the page header), line 228. The next 4 bytes form one long word that provides the absolute file offset to the next page, line 230.

Following the file offset to the next page is 1 byte that indicates the page orientation, line 232. Specifically, the page orientation number is stored as follows:

| Store Number | Orientation |
|---|---|
| 0xxx xxxx | Unknown |
| 1xxx xx00 | 0° |
| 1xxx xx01 | 90° |
| 1xxx xx10 | 180° |
| 1xxx xx11 | 270° | where x designates a don't care. This byte can be used to signal display software so that the image can be processed "right side up". Following the page orientation specifier are 15 bytes all set to 0, line 234. These bytes are set aside for future use. Line 234 completes the page header, and as shown in FIG. 2, image data information follows.

Referring now to FIG. 3, each run length (except the last) is individually stored in either one byte, if the run length is less than 128 bits long; or two bytes, if the run length is more than 127. Whether the run length is less than 128 bits is specified by the most significant bit of each byte (shown as the far left bit in each line in FIG. 3). If the first bit is a zero, such as in lines 302 and 304 of FIG. 3, the stored run length is less than 128. In that case, the run length is determined by reading the remaining seven bits of the subject byte as a binary value (FIG. 3 shows the least significant bit at the far right). For example, the 00000101 of line 302 designates a run of 5 bits while the 00010000 of line 304 designates a run of 16 bits.

However, if the first bit in a byte is a 1, such as is shown on line 306, the run length is known to utilize two bytes, and thus the information on line 308 is known to be a part of the run length begun on line 306. Two bytes may be required since a run length can be longer than the length indicatable by one byte. For example, a length of 512 would require at least nine bits, and thus two bytes are required when binary encoded. When two bytes are used, the run length is equal to (A) 128 times the binary number indicated by the remaining seven bits of the first byte (B) plus the binary number indicated by the second byte. For example, the 10000100 on line 306 indicates that the run length uses two bytes (per the 1 of the far left bit), and that the run length is 128 times 4 (4 being the equivalent of binary 0000100) or 512, plus 9 (9 being equivalent to binary 00001001 per line 308), or a total of 521.

Referring now to line 310 of FIG. 3, a special end of line character (EOL), defined as 10000000 (128), is stored at the end of each scan line. As indicated, the last run length of each scan line is not stored since it is easily determined using the number of pixels in each scan line and the sum of all the other run lengths occurring from the start of the subject scan line. For example, assume that a scan line is 1728 pixels long, and that line 302 is the first run length of a scan line in which the last run length is to be determined. The last run length is found by recalling the scan line length (1728) and subtracting from it the sum of the other run lengths. Those lengths, on lines 302 (length 5), 304 (length 16), and 306–308 (length 521), total 542. Thus, the last run length of the subject scan line is 1728−542, or 1186.

The "colors" of each run length, either black or white, are determined as are the colors in G3-type transmissions. The first run length of each scan line is always white, and the colors then alternate between white and black for successive run lengths. If the first color in a facsimile image scan line is black, a zero-length white run (coded 00000000) is stored first. Using this scheme, and assuming once again that line 302 is the first run length of a scan line, lines 302, 306, and 312 are represent white runs; line 304, the unstored run length for the 1$^{st}$ scan line, represents a black run. The one wrinkle to this scheme is highlighted by lines 318 and 320, when consecutive EOL characters occur it is known that a white line occurs across the page.

From the foregoing it is reasonable to assume that numerous modifications and variations of the principles of the present invention will be obvious to those skilled in its art. Therefore the scope of the present invention is to be limited only by the appended claims.

What is claimed:

1. A memory device storing a data file containing data representative of pixels of an image, that data composed of run length encoded segments, each of which individually represents a number of pixels of the image, the run length encoded segments being organized into a plurality of scan lines, each scan line representative of a specified number of pixels of the image, the data file comprised of:
   a file header containing information relating to the dimensions of the data file; and
   a page of data containing information about the number of pixels to be represented by each scan line, said page of data further containing said plurality of scan lines, each of which ends with an end-of-line character and each which are comprised of explicit run length encoded segments such that the summation of the number of pixels individually represented by the explicit run length encoded segments is no greater than the number of pixels in each scan line;
   wherein the difference between the number of pixels in each scan line and the summation of the number of pixels individually represented by the explicit run length encoded segments represents an implicit run length encoded segment for that scan line.

2. The memory device according to claim 1 wherein each explicit run length encoded segment is defined by byte boundaries.

3. The memory device according to claim 2 wherein exactly one bit of each explicit run length encoded segment specifies whether that explicit run length encoded segment is contained in more than one byte.

4. The memory device according to claim 3 wherein the explicit run length encoded segments stored in a single byte are stored in a binary encoded format.

5. A method of digitally storing data representative of pixels of a facsimile image that is organized into a plurality of scan lines, wherein each scan line represents a known number of pixels, and wherein those pixels are organized in run length encoded data segments, each of which individually represents a number of pixels of the scan line, the method comprising the steps of:

creating a file header containing information relating to the file;

creating at least one page header which contains information relating to the number of pixels in each scan line; and storing each scan line as a set of explicit byte boundary limited encoded run lengths, an end-of-line character, and an implicit encoded run length, wherein the summation of the number of pixels individually represented by the explicit byte boundary limited encoded run lengths is no greater than the number of pixels in each scan line, and wherein the implicit encoded run length is equal to the difference between the number of pixels in each scan line and the summation of the number of pixels individually represented by the explicit byte boundary limited encoded run lengths.

6. The method according to claim 5, further including the step of assigning to one bit of each explicit byte boundary encoded run length a value that specifies whether that encoded run length is contained in more than one byte.

7. In a computer system of the type having a central processing unit and a memory storing data representative of a facsimile image composed of a plurality of scan lines, wherein each scan line represent a known number of pixels, and wherein the pixels of each scan line are run length encoded, the steps executed by the central processing unit of:

(a) creating a target data file in a memory, said target data file including memory allocated to a file header and to a page of data;

(b) determining from the stored data representative of a facsimile image the length of each scan line;

(c) storing said determined scan line length as part of a page header in said page of data;

(d) determining the end of each scan line;

(f) converting all except the last run length of each scan line of the stored data representative of a facsimile image into byte boundary limited binary encoded data blocks; and (g) storing said byte boundary limited binary encoded data blocks in scan lines that terminate with an end-of-line character in said page of data.

* * * * *